(12) United States Patent
Feng et al.

(10) Patent No.: US 7,675,711 B2
(45) Date of Patent: Mar. 9, 2010

(54) MEASURING AND NEUTRALIZING THE ELECTRICAL CHARGE AT THE INTERFACE OF A MAGNETIC HEAD AND MEDIA

(75) Inventors: Zhu Feng, Pleasanton, CA (US); Ellis Cha, San Ramon, CA (US); Xiaofeng Zhang, Fremont, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 806 days.

(21) Appl. No.: 10/434,258

(22) Filed: May 7, 2003

(65) Prior Publication Data

US 2004/0223262 A1 Nov. 11, 2004

(51) Int. Cl.
*G11B 5/60* (2006.01)
*G11B 5/82* (2006.01)
(52) U.S. Cl. ............. 360/235.1; 360/135; 360/125.71
(58) Field of Classification Search ............ 360/235.1, 360/235.2, 235.3, 234.5, 125.71, 125.72, 360/125.3, 135
See application file for complete search history.

(56) References Cited

U.S. PATENT DOCUMENTS

| 4,853,810 A | | 8/1989 | Pohl et al. |
| 4,863,809 A | * | 9/1989 | Brar et al. ............... 428/623 |
| 5,251,081 A | * | 10/1993 | Cossette et al. .......... 360/97.02 |
| 6,324,031 B1 | * | 11/2001 | Comstock et al. ........ 360/97.02 |
| 6,359,746 B1 | | 3/2002 | Kakekado et al. |
| 7,327,535 B2 | * | 2/2008 | Feng et al. ............... 360/235.4 |
| 7,357,875 B2 | * | 4/2008 | Feng et al. ............... 216/22 |

FOREIGN PATENT DOCUMENTS

| JP | 2000-231768 | 8/2000 |
| JP | 2000-251242 | 9/2000 |
| JP | 2001-084724 | 3/2001 |

OTHER PUBLICATIONS

Digests of INTERMAG 99, 1999 IEEE International Magnetics Conference, Digest of Technical Papers, by Zhu Feng et al., May 18-21, 1999, Korea, "Head Disk Interface Charge and It's Potential Applications.".

* cited by examiner

*Primary Examiner*—Brian E Miller
(74) *Attorney, Agent, or Firm*—Saile Ackerman LLC; Stephen B. Ackerman; Rosemary L. S. Pike

(57) ABSTRACT

A system and method for measuring and neutralizing the electrical charge at the interface of a magnetic head and a magnetic storage medium, such as a disk, is disclosed. A surface treatment material is applied to the magnetic head. The surface treatment material matches the medium surface material on the surface of the magnetic storage medium. The surface treatment material on the magnetic read/write head may be a fluorinated carbon, such as a Fomblin Z-derivative, perfluoro alkyl trichlorosilane, a FC-722, or a fluorinated polymer. The surface treatment material can be applied to the magnetic head by a vapor deposition process or by a liquid immersion process. The charge on the head-disk interface can be measured by applying varying external charges to the head while reading a signal previously written to the disk.

11 Claims, 11 Drawing Sheets

MEASURING AND NEUTRALIZING THE ELECTRICAL CHARGE AT THE INTERFACE OF A MAGNETIC HEAD AND MEDIA

BACKGROUND INFORMATION

The present invention relates to magnetic hard disk drives. More specifically, the present invention relates to a method of measuring and neutralizing the electrical charge at the interface of the magnetic head and the magnetic storage media.

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few nanometers above the surface of the rotating disk. The flying height of the slider is viewed as one of the most critical parameters affecting the magnetic disk reading and recording capabilities of a mounted read/write element. A relatively small flying height allows the transducer to achieve greater resolution between different data bit locations on the disk surface, thus improving data density and storage capacity. With the increasing popularity of lightweight and compact notebook type computers that utilize relatively small yet powerful disk drives, the need for a progressively lower flying height has continually grown.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 2 and 4, the large surface area of the slider body 5 would produce an excessively large air bearing surface area. In general, as the air bearing surface area increases, the amount of lift created is also increased. Without rails, the slider would therefore fly too far from the rotating disk thereby foregoing all of the described benefits of having a low flying height.

As illustrated in FIG. 2, a head gimbal assembly 40 often provides the slider with multiple degrees of freedom such as vertical spacing, or pitch angle and roll angle which describe the flying height of the slider. As shown in FIG. 2, a suspension 74 holds the HGA 40 over the moving disk 76 (having edge 70) and moving in the direction indicated by arrow 80. In operation of the disk drive shown in FIG. 2, an actuator 72 (such as a voice-coil motor (VCM)) moves the HGA over various diameters of the disk 76 (e.g., inner diameter (ID), middle diameter (MD) and outer diameter (OD)) over arc 75.

The electrical charge at the magnetic head and disk interface can cause serious tribology and reliability problems, such as lubrication degradation, head-disk spacing change, and electrostatic damage of the magnetic sensor. With spacing between the head and disk getting smaller for higher recording density, there is an increased chance of head-disk interactions and therefore, more electrical charge at the head-disk interface due to tribo-charge effects.

In view of the above, there is a need for a system and a method of measuring and reducing accumulated charge on the magnetic read/write head.

DETAILED DESCRIPTION

A system and method for measuring and neutralizing an electrical charge at the interface of a magnetic head and a magnetic storage medium, such as a disk, is disclosed. In one embodiment, the charge on the head-disk interface may be measured by applying varying external charges to the head while reading a signal previously written to the disk. In a further embodiment, a surface treatment material is applied to the magnetic head to neutralize electrical charge on the magnetic head. The surface treatment material may match the surface material of the magnetic storage medium. In a further embodiment, both materials may be a fluorocarbon, such as a Fomblin Z-derivative, fluorinated alkyl-trichlorosilane, fluorinated alkyl-trialkyloxysilane, and fluorinated surfactants. In one embodiment, the surface treatment material may be applied to the magnetic head by a vapor deposition process or by a liquid immersion process.

Figure 1:
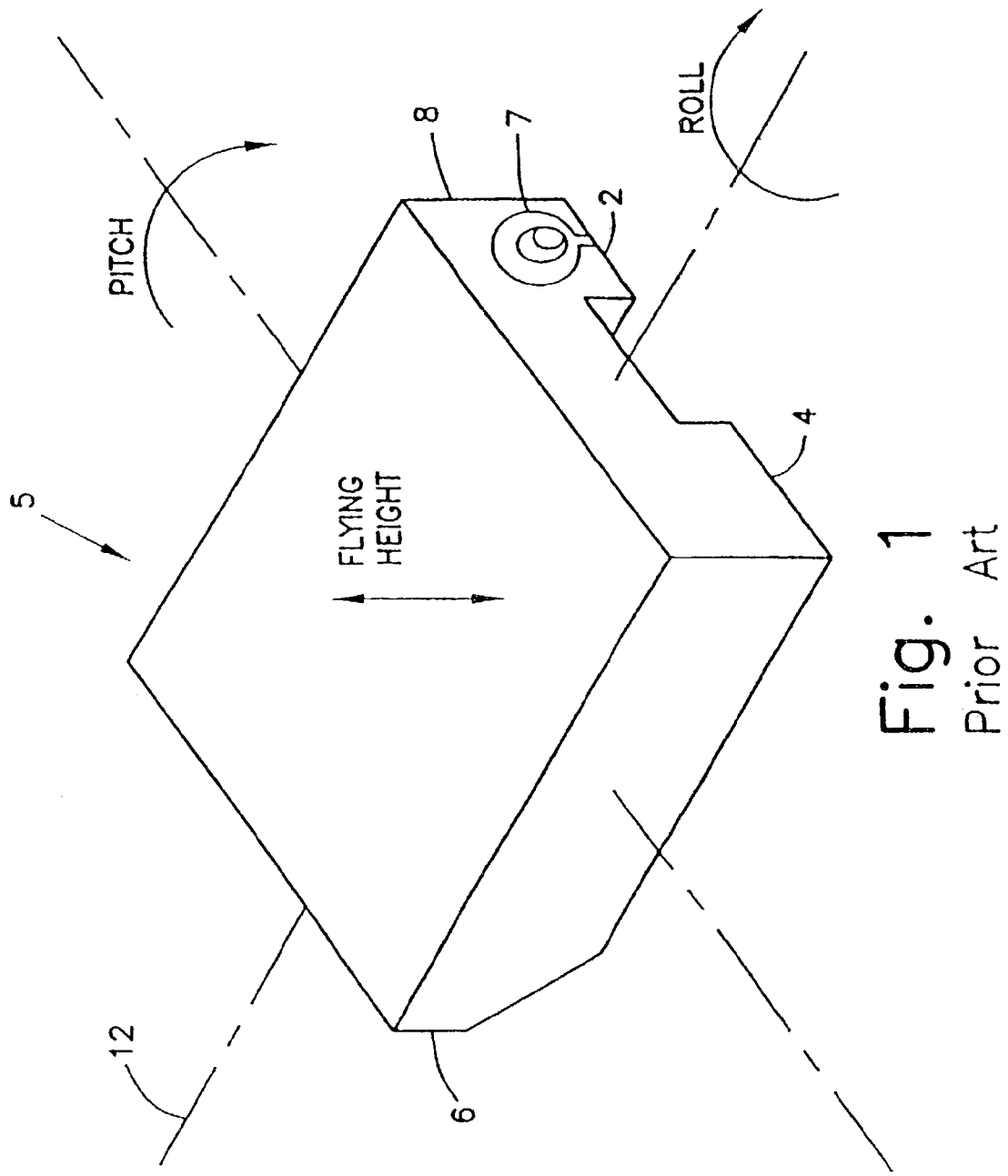
FIG. 1 is a perspective view of a slider device with a read/write head that is known in the art.
Figure 2:
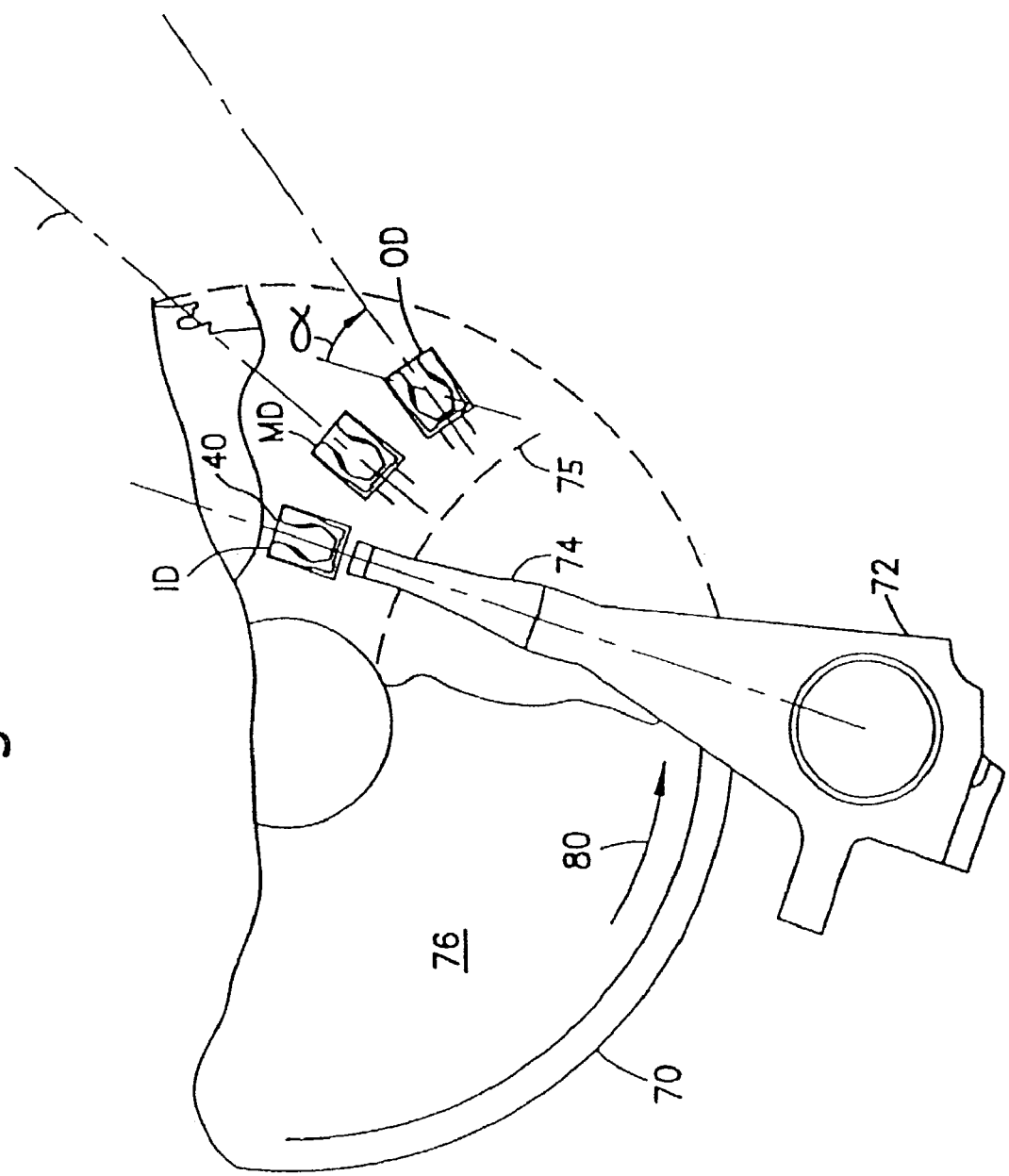
FIG. 2 is a perspective view of a disk drive device that is known in the art.
Figure 3:
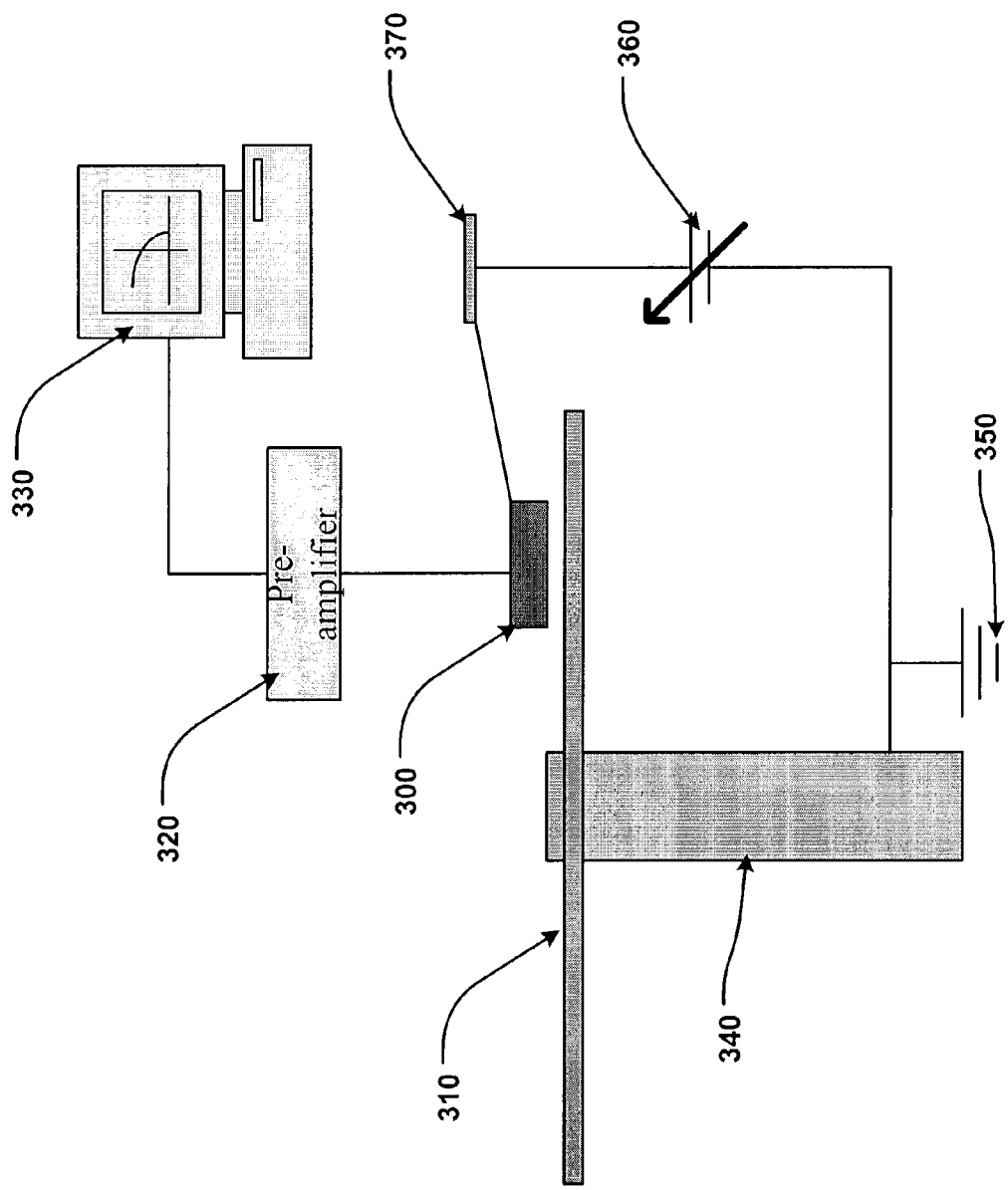
FIG. 3 provides an illustration of a head disk interface (HDI) charge measurement apparatus according to an embodiment of the present invention.

According to an embodiment of the present invention, a process for determining the head-disk interface (HDI) charge uses variations in readings of a stored signal caused by the application of an external voltage to the magnetic head. FIG. 3 illustrates one embodiment of a HDI charge measurement apparatus. In one embodiment, a magnetic head 300 reads data from and writes data to a magnetic data storage medium, such as a disk 310. In a further embodiment, the magnetic head 300 sends a signal to a pre-amplifier 320, which amplifies the signal before sending the signal on to a processing unit 330 for processing the data. In an additional embodiment, the disk 310 rotates on a spindle 340 that is coupled to ground 350. In one embodiment, the magnetic head 300 is isolated from the ground 350. The magnetic head 300 is also coupled to a variable charge or voltage source 360 via an isolated suspension mounting 370.

Figure 4:
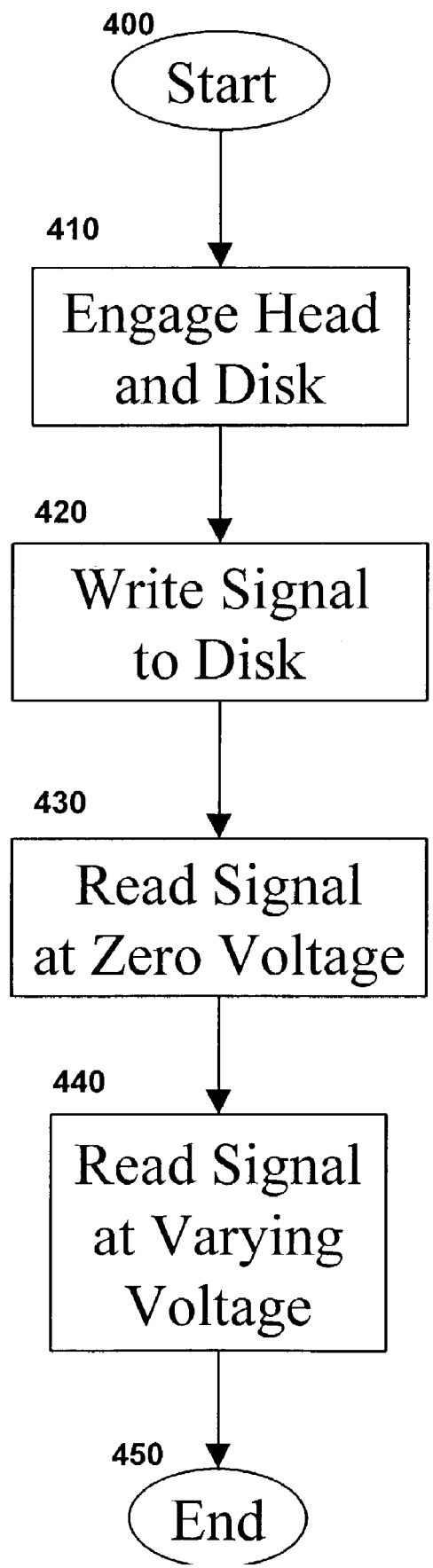
FIG. 4 provides a flowchart illustrating an HDI charge measurement process according to an embodiment of the present invention.

FIG. 4 illustrates in a flowchart one embodiment of an HDI charge measurement process. The process starts (Block 400) by engaging the magnetic head 300 relative to the disk 310 (Block 410). The magnetic head 300 writes a signal to one or more tracks on the disk 310 (Block 420). Once written to the surface, this signal can also serve as an indicator of head-disk spacing during the write operation. The magnetic head 300 then reads the signal back from the disk 310 at zero external voltage from supply 360 (Block 430). The magnetic head 300 then reads the written signals on the disk 310 with different external voltages applied by the voltage source 360 (Block 440). In one embodiment, the external voltage can be varied from −5 to 5 volts, depending on the actual spacing between the head 300 and the disk 310. After a set number of external voltages have been used, the process is finished (Block 450).

Figure 5:
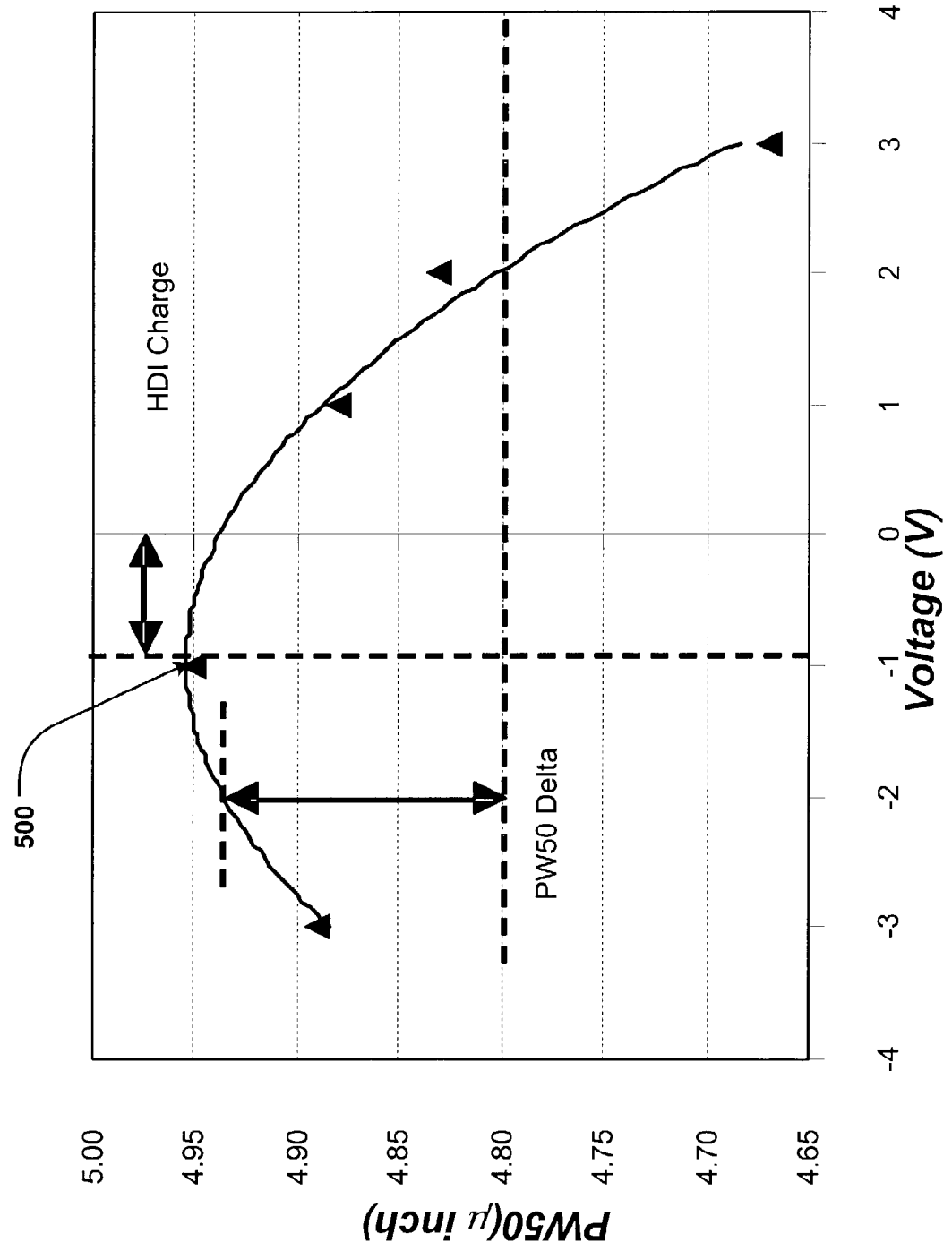
FIG. 5 provides a graph illustrating an HDI charge measurement reading according to an embodiment of the present invention.

FIG. 5 illustrates a graph of an HDI charge measurement resulting from the HDI charge measurement process according to an embodiment of the present invention. In the graph, the pulse width at 50% (PW50) in micro-inches is plotted against voltage in volts. The pulse width at 50% is found by measuring the distance between when the pulse is at 50% of the amplitude on the ascending slope and when the pulse is at 50% of the amplitude on the descending slope. In an embodiment in which no HDI charge is present, the PW50 should decrease when either positive or negative voltage is applied to the magnetic head 300, due to reduced spacing at the head-disk interface. In one embodiment, the relationship between the head-disk interface and electric charge can be modeled as a quasi-parallel capacitor, where the head-disk spacing (d), voltage applied (V), and the attractive force (f) relationship follows the equation $f = k V^2/d^2$, where k is a constant. As a result of this relationship, the spacing d decreases with increasing V after the forces acting upon the head are at at equilibrium. As is seen by the graph in this embodiment, the PW50 increases as a negative voltage is applied until reaching a maximum 500, at which point the PW50 begins to decrease. The maximum 500 is offset from the zero voltage position due to a negative charge being present on the disk surface. This negative charge will repel the same charge from the opposite surface of the magnetic head or cancel the effects of charging from the opposite surface, leading to an increased PW50. When this negative charge is overcome by the external charge/voltage, then the PW50 decreases again with the applied voltage. In one embodiment, the HDI charge is given as the voltage that corresponds to the peak PW50 value. In an alternate embodiment, the HDI charge is given as PW50 delta for a given absolute voltage. One way to depict the asymmetry of PW50 versus voltage curve is to arbitrarily define the delta as the difference between PW50 at +2V and PW50 at −2V. The bigger the PW50 delta, the more asymmetry of the PW50 versus voltage curves.

Figure 6:
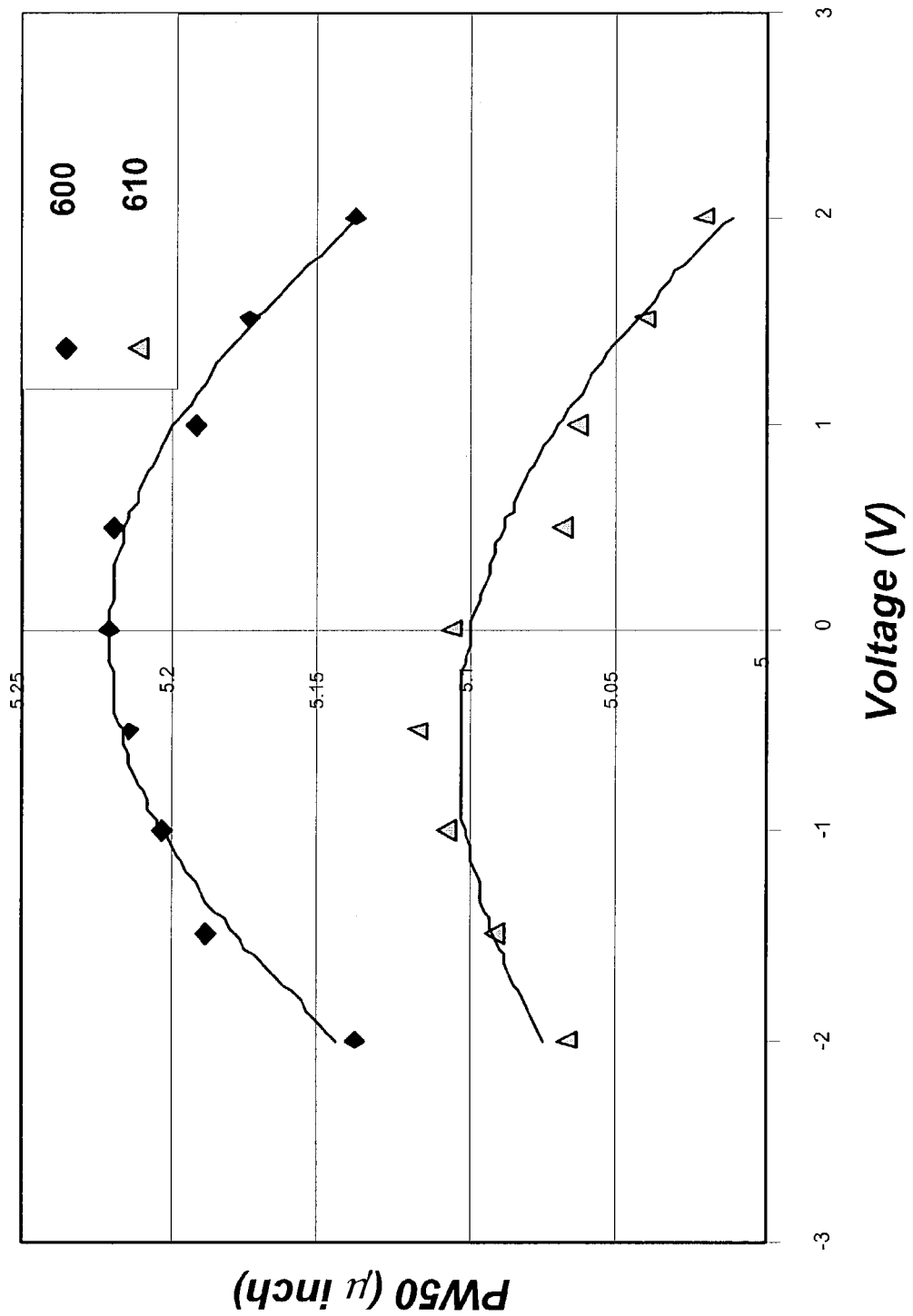
FIG. 6 provides a graph comparing an HDI charge measurement reading of a coated magnetic head and a non-coated magnetic head according to an embodiment of the present invention.

In one embodiment, the HDI charge is caused by the lubricants present on the disk 310 surface to protect the disk surface against stiction and mechanical wear. Often the lubricant used is a fluorinated carbon, such as a Fomblin Z derivative. Fluorinated carbons have a high affinity for electrons, because of the presence of fluorine. When the disk surface is rubbed, either during the disk fabrication process or during takeoff of the magnetic head, the tribo-charge process generates electrons and positive ions. Due to its high affinity for electrons, a fluorinated polymer will attract electrons and then assumes a negative charge/potential. Furthermore, since the fluorinated polymer is a dielectric material, the collected negative charge will not quickly dissipate through the disk substrate. Instead, the negative charge is gradually neutralized through the absorption of molecules with positive charges from the environment. However, the head flying over the disk produces a sub-ambient pressure, causing the absorbed molecules to be quickly evaporated and brings back the negative charge effect. The negative charge on the disk surface induces a positive charge on the magnetic head, forming a quasi-parallel capacitor with an attraction force between the head and the disk. In one embodiment, this is counteracted by coating the magnetic head with a thin layer of material that is the same as or similar to the coating on the disk, causing both surfaces to exhibit the same sign of electrical charge when they are brought together in the HDI of a disk drive. Because of the same or similar surface charge, the attractive forces between the head and disk should be minimized or eliminated. FIG. 6 illustrates in a graph a comparison of an embodiment of a magnetic head with the coating 600 and an embodiment of a magnetic head without the coating 610. The magnetic head with the coating 600 has a maximum PW50 measurement at zero external voltage. The magnetic head without the coating 610 has a maximum at an external voltage of around −0.5 volts.

Figure 7:
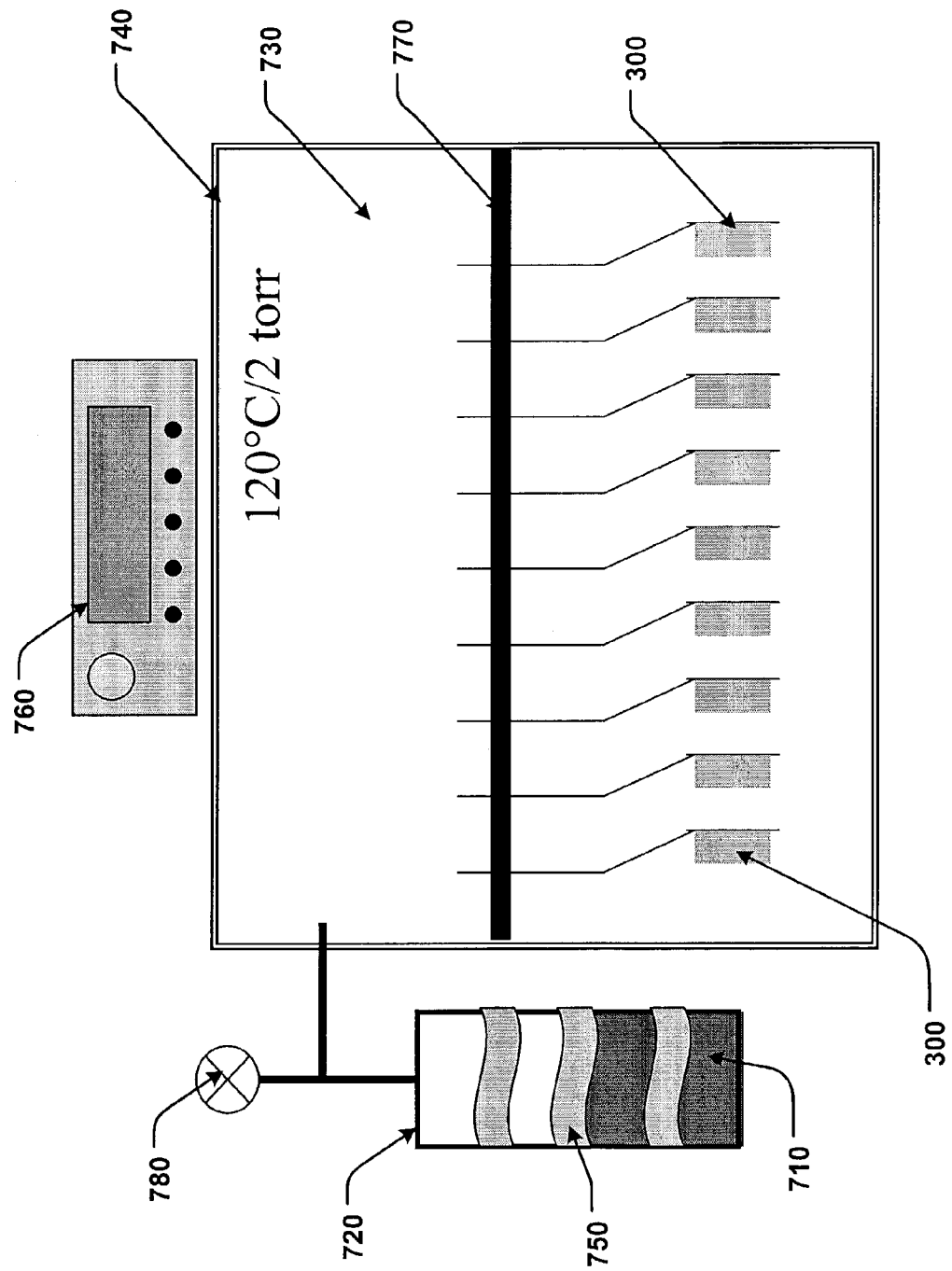
FIG. 7 provides an illustration of an HDI charge preventative coating application according to an embodiment of the present invention.
Figure 8:
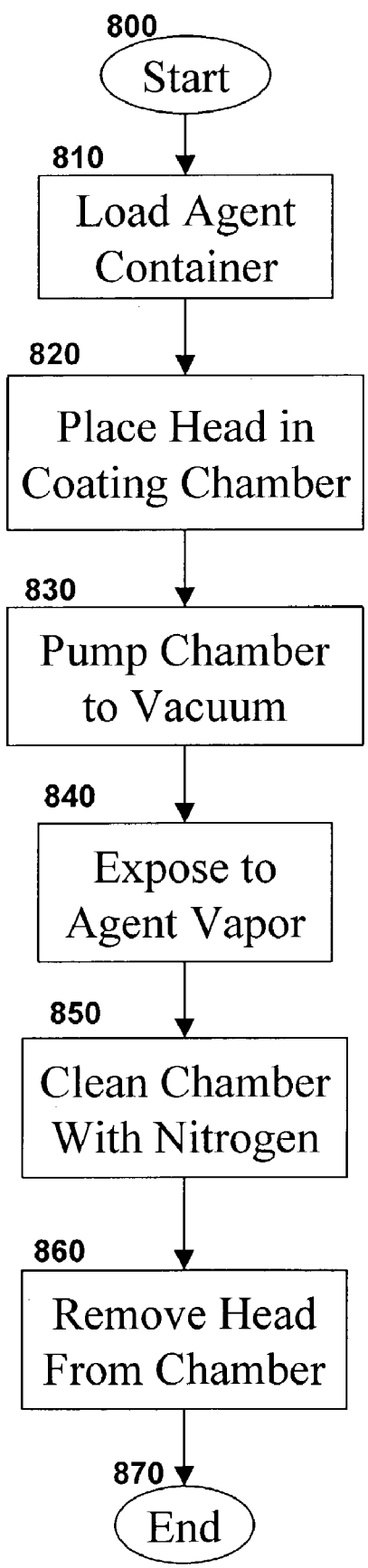
FIG. 8 provides a flowchart illustrating a vapor deposition process for applying an HDI charge preventative coating according to an embodiment of the present invention.

In one embodiment, a fluorinated carbon, such as perfluoro decyl trichlorosilane (PFDTS), may be applied either by vapor deposition process or liquid immersion process. In another embodiment of the present invention, using the system of FIG. 7, a vacuum coating process for applying the monolayer surface coating to the magnetic head is provided and illustrated in the flowchart of FIG. 8. The process starts (Block 800) by filling monolayer agent 710 into a glass flask 720 (Block 810), which then provides low pressure vapor 730 of the active agent to the coating chamber 740. In this example, the monolayer agent 710 is pure (96% or greater) PFDTS in the glass flask 720, which is heated up by heating tape 750 to 100° C. to obtain higher vapor pressure. A temperature controller 760 may control the heating of the monolayer agent 710. The magnetic read/write head 300 is hung by a rack 770 in the coating chamber (Block 820). The coating chamber 740 is cleaned first by pumping down to a low vacuum level and backfilling with nitrogen gas for a few cycles to remove residual moisture (Block 830). The magnetic read/write head 300 is then exposed to the vapor 730 of the monolayer agent for 30 minutes (Block 840). After the valve 780 for active agent is closed, the coating chamber 740 is cleaned again by pumping down to low vacuum and backfilling with nitrogen gas for a few cycles to remove excess coating and byproducts (Block 850). The magnetic read/write head 300 is removed from the chamber 740 (Block 860), ending the process (Block 870). The length of time varies depending on requirements for chamber cleanliness and coating quality. In one embodiment, the chamber temperature was 105 degrees Celsius. However, monolayer coating has been successfully deposited on the substrate in a wide range of temperatures between 20° C. to 250° C.

Figure 9:
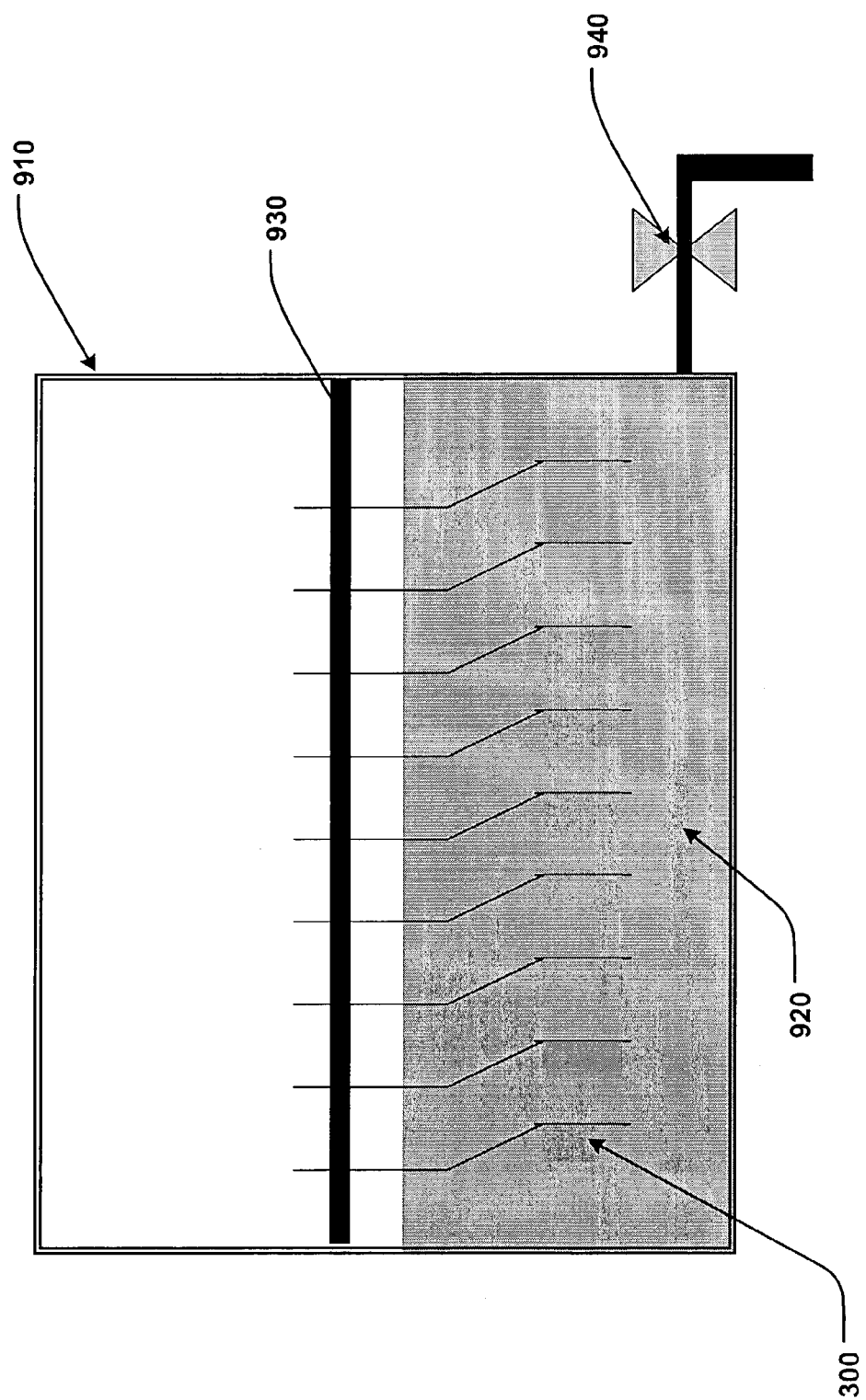
FIG. 9 provides an illustration of a liquid immersion system for applying an HDI charge preventative coating according to an embodiment of the present invention.
Figure 10:
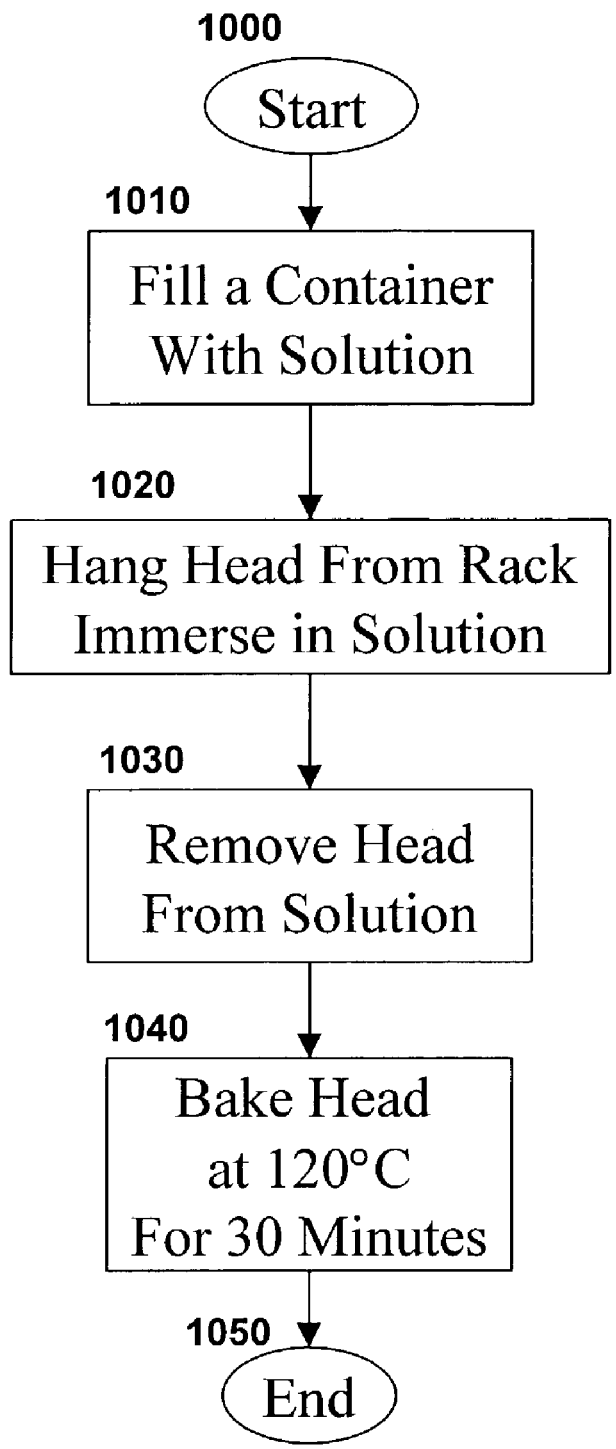
FIG. 10 provides a flowchart illustrating a liquid immersion process for applying an HDI charge preventative coating according to an embodiment of the present invention.

In an alternate embodiment, FC-722, a fluorinated carbon produced by 3M®, is used as the surface coating, the FC-722 having similar electron affinities as the surface coating of the magnetic media storage. In one embodiment, FC-722 is deposited on the head using a liquid immersion process. In one embodiment of the present invention, using the system of FIG. 9, a liquid process is provided for applying the monolayer surface coating to the magnetic head and is illustrated in the flowchart of FIG. 10. The process starts (Block 1000) by filling a container 910 filled with a solution 920 (Block 1010). The solution may be a mixture of fluorinated solvent, such as PF5060 by 3M®, and the active agent FC-722. The magnetic read/write heads 300 may be hung from a rack 930 and immersed into the monolayer solution 920 (Block 1020). After 10 minutes, the magnetic read/write head 300 is removed from the monolayer solution 920 by draining the monolayer solution 930 out through a bottom drain 940 (Block 1030). The magnetic heads may be removed and placed in an oven at 120 degrees Celsius for 30 minutes to remove excess solvent and to cure the coating (Block 1040), ending the process (Block 1050).

Figure 11:
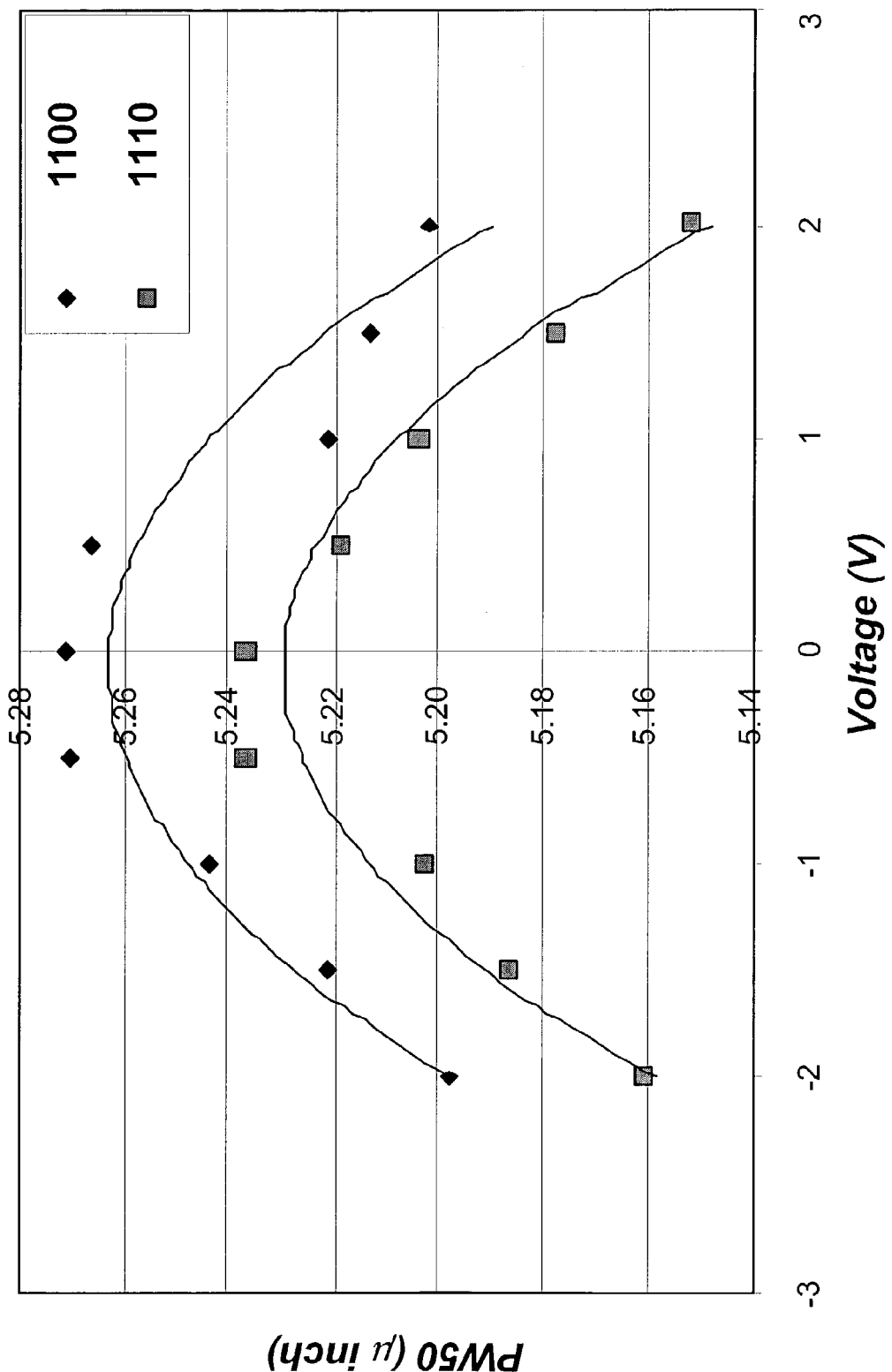
FIG. 11 provides a graph illustrating an HDI charge measurement reading of an alternative HDI charge preventative coating according to an embodiment of the present invention.

FIG. 11 illustrates in a graph one embodiment of an HDI charge measurement of a first head 1100 and a second head 1110, each having received a surface coating of FC-722.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A magnetic read/write apparatus, comprising:
   a slider including a magnetic head to read data from and write data to a magnetic storage medium; and
   a surface treatment material provided on the magnetic head which matches a medium surface material on a surface of the magnetic storage medium wherein both materials arc a fluorinated polymer wherein an external electrical charge applied to the magnetic head is used to take a measurement of an interface charge, wherein the measurement is taken by writing a signal on the magnetic storage medium, reading the signal back with zero external charge applied to the magnetic head, and reading the signal back with varying external electrical charges.

2. The magnetic read/write apparatus of claim 1, wherein the surface treatment material is applied using a vapor deposition process.

3. The magnetic read/write apparatus of claim 1, wherein the surface treatment material is applied using a liquid immersion process.

4. The magnetic read/write apparatus of claim 1, wherein the magnetic head is electrically isolated from a ground.

5. The magnetic read/write apparatus of claim 1, wherein the signal is a pulse width at 50% height.

6. A system, comprising:
   a magnetic storage medium to store data, the magnetic storage medium covered by a medium surface material; and
   a slider including a magnetic head to read data from and write data to the magnetic storage medium, the magnetic head covered by a head surface treatment material matching the medium surface material wherein both materials are a fluorinated polymer, further including an external electrical charge source applied to the magnetic head to take a measurement of an interface charge, wherein the measurement is taken by writing a signal on the magnetic storage medium, reading the signal back with zero external charge applied to the magnetic head, and reading the signal back with varying external electrical charges.

7. The system of claim 6, wherein the surface treatment material is applied using a vapor deposition process.

8. The system of claim 6, wherein the surface treatment material is applied using a liquid immersion process.

9. The system of claim 6, wherein the magnetic storage medium includes a magnetic disk electrically coupled to a ground via a spindle.

10. The system of claim 9, wherein the magnetic head is electrically isolated from the ground.

11. The system of claim 6, wherein the signal is a pulse width at 50% height.

* * * * *